United States Patent [19]

Adamson et al.

[11] Patent Number: 5,368,228
[45] Date of Patent: Nov. 29, 1994

[54] METHOD AND APPARATUS FOR FORMING A FLUID PROJECTION SCREEN

[75] Inventors: William G. Adamson, Pacoima; Lance D. Updyke, Simi Valley, both of Calif.; John W. Sogge, Orlando, Fla.

[73] Assignee: The Walt Disney Company, Burbank, Calif.

[21] Appl. No.: 50,533

[22] Filed: Apr. 20, 1993

[51] Int. Cl.⁵ .......................... G03B 21/60; B05B 1/04
[52] U.S. Cl. ...................... 239/18; 239/523; 239/524; 239/590.5
[58] Field of Search .................. 239/11, 12, 16–18, 239/20–23, 518, 521, 523, 524, 590.5; 359/443

[56] References Cited

U.S. PATENT DOCUMENTS

| | | | |
|---|---|---|---|
| 620,592 | 3/1899 | Just | 359/443 |
| 1,882,922 | 10/1932 | Robinson et al. | 239/521 |
| 2,089,673 | 8/1937 | Steinmann | 239/518 |
| 2,408,588 | 10/1946 | Watts | 239/590.5 |
| 3,045,931 | 7/1962 | Hall | 239/524 |
| 3,069,100 | 12/1962 | Schuler | 239/524 |
| 3,334,816 | 8/1967 | Mizuno | 239/18 |
| 4,749,126 | 6/1988 | Kessener et al. | 239/18 |
| 4,974,779 | 12/1990 | Araki et al. | 239/18 |
| 5,067,653 | 11/1991 | Araki et al. | 239/18 |
| 5,265,802 | 11/1993 | Hobbs et al. | 239/18 |

FOREIGN PATENT DOCUMENTS 0192237  10/1984  Japan .................... 359/443

Primary Examiner—Karen B. Merritt
Attorney, Agent, or Firm—Richard S. Erbe

[57] ABSTRACT

The invention relates to a method and apparatus for creating a fluid screen for use in entertainment. Provided is a mechanically simple and effective way of creating a fluid screen which facilitates the projection of still and moving pictures upon it. The fluid screen is generated by pumping water, or other comparable fluid, through a fluid screen nozzle having an axial flow director and a nozzle insert. The fluid, at a given pressure and flow rate, is directed through the axial flow director, past the internal end of the nozzle insert and its transition section and then onto and away from its radial stabilizer. The fluid is guided by the radial stabilizer of the nozzle insert to form the fluid screen. Each of the regions mentioned contribute to creating the desired shape of the projection surface. Performance may be further enhanced by having a flow straightening area adjacent to the axial flow director, a reducer prior to the nozzle insert, and texturing the surfaces of the transition section and radial stabilizer.

25 Claims, 3 Drawing Sheets

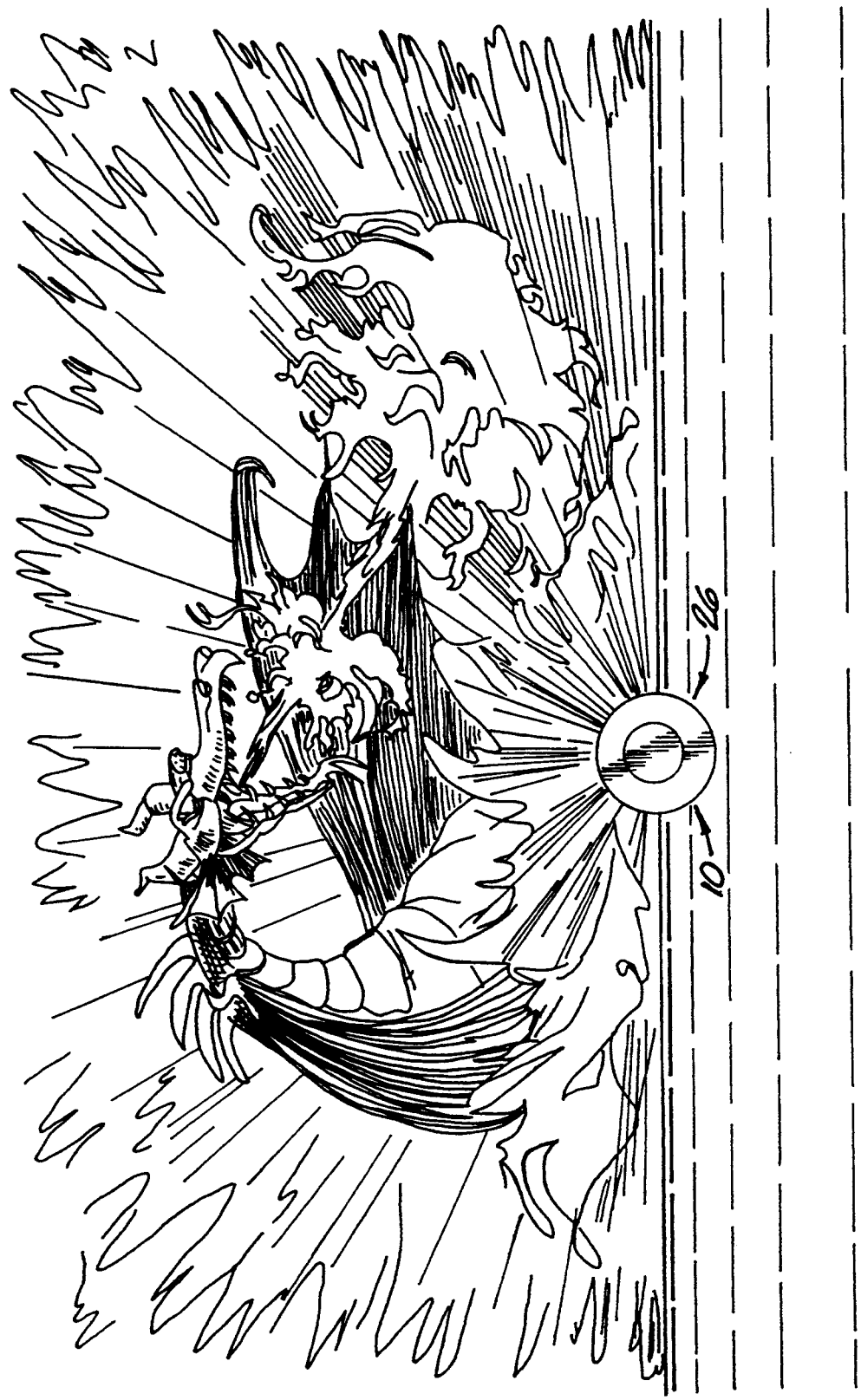

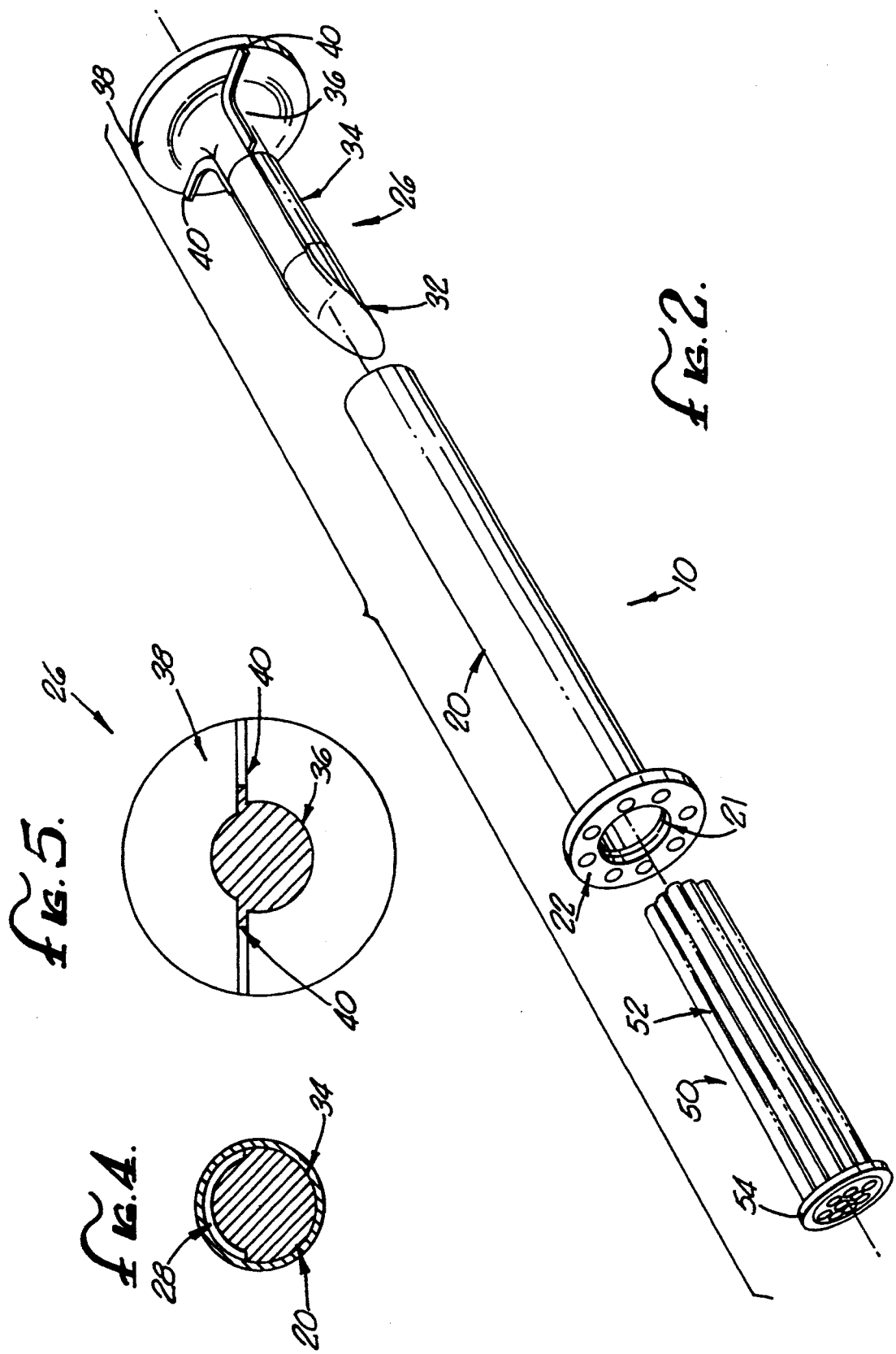

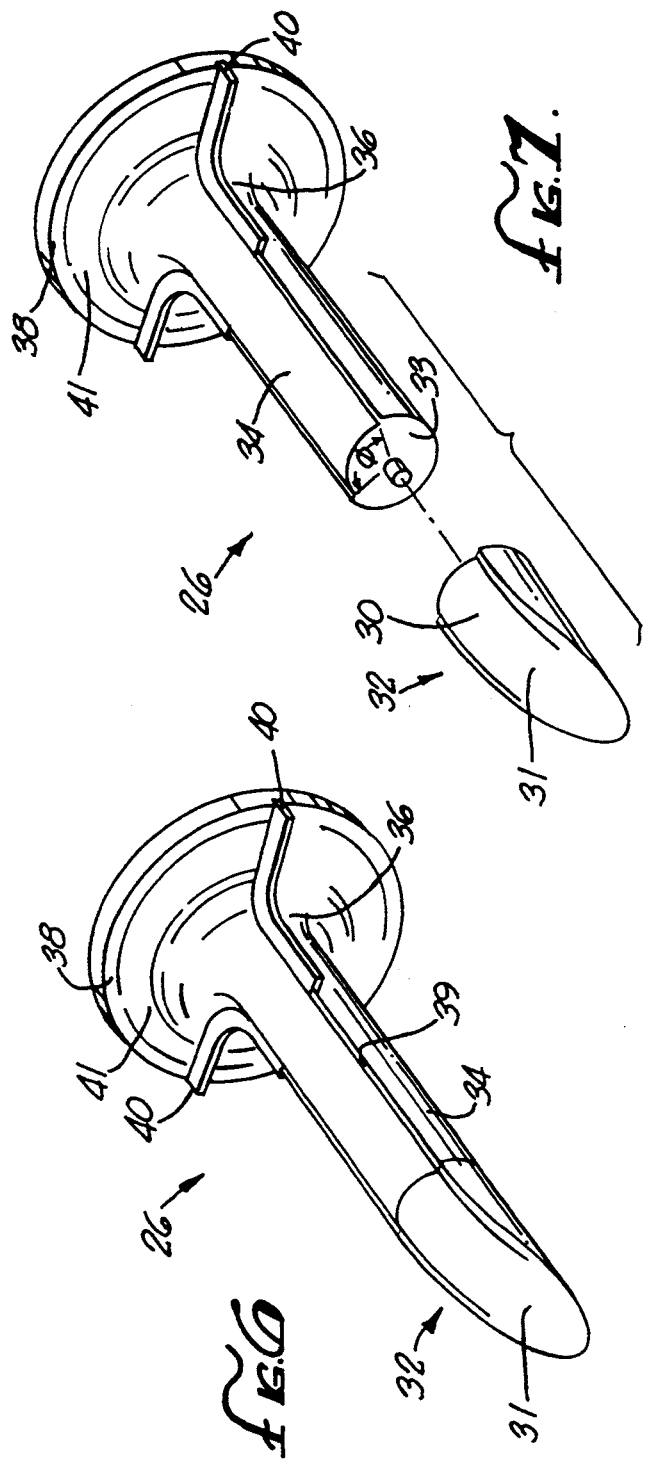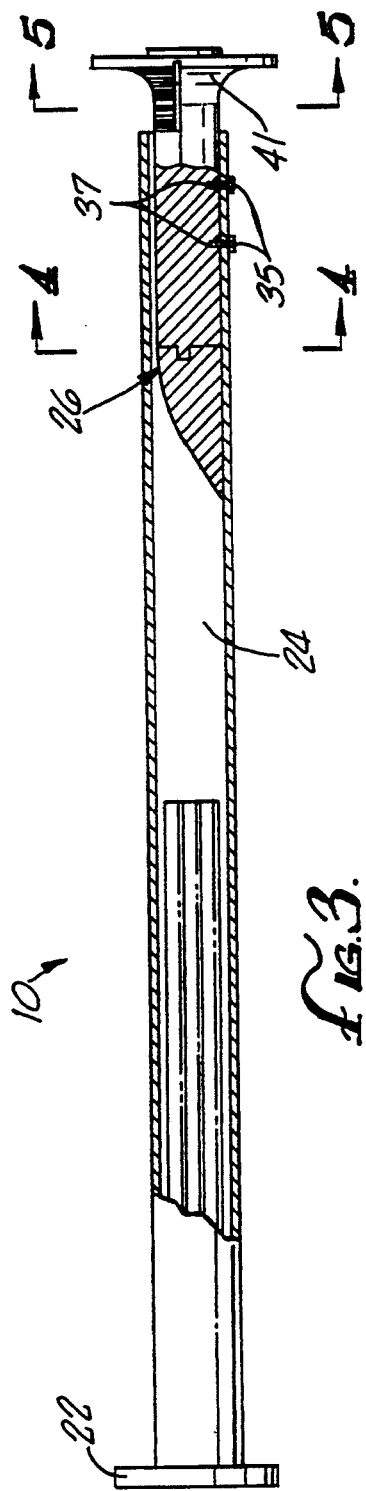

METHOD AND APPARATUS FOR FORMING A FLUID PROJECTION SCREEN

BACKGROUND OF THE INVENTION

1. Field of the Invention

The present invention relates generally to water effects and, more particularly, to a method and apparatus for forming a projection screen using water, or other fluid, as the projection surface.

2. Description of the Related Art

Attractive water displays have been used for entertainment purposes for many years. These displays have taken the form of imaginative water fountains depicting a variety of pleasing shapes, often in conjunction with light, sound and other effects. In more recent times, water displays have included using water screens along with the variety of water fountains. The water screen can be further combined in various ways with still and moving pictures for an enhanced visual effect. Using projection water screens is particularly desirable for enhancing visual effects because it provides easy and fast set up and inexpensive and quick removal of the screen. Prior efforts have included U.S. Pat. No. 3,334,816 Shuzo Mizuno, Apparatus for Projecting an Image on a Jet of Water, 1967 which relates to apparatus for projecting on a water screen created by jets of water formed by rows of nozzles; U.S. Pat. No. 4,974,779 Araki, Screen Forming Apparatus and Method, 1990, and U.S. Pat. No. 5,067,653 Araki, Screen Forming Apparatus and Method, 1991, the Araki patents each having a device and method of forming a projection water screen by using a plurality of water spray nozzles disposed along a longitudinal pipe.

These prior art projection water screens have had a number of problems in trying to achieve the desired effects. In particular, the clarity of the image upon the water projection screens of the prior art devices was marginal. At the same time, the image brightness was adequate, but improvement was desirable. Moreover, maintainable and acceptable uniformity of the picture focus and illuminance across the projection screen was decidedly lacking.

For projection water screens, particularly those generated using multiple nozzles, surfaces of the projection water screens that are formed tend to be non-uniform due to the uneven flow of the fluid. At least one known prior art projection water screen, manufactured by Aquatique, and disclosed in EPO Patent Application No. 91401291.9, Publication No. 469936 Formhals, et al., is designed to have a pulsing exit pressure which causes concentric ripples radiating from the water nozzle to be formed in the water screen. Moreover, the turbulence vectors of the fluid flowing through the Aquatique nozzle cause consistent standing modulations in the distribution of the spray. These non-uniformities have resulted in projection water screens which have distortions and uneven brightness when still or moving images are projected upon them.

Another problem that has been experienced in using the prior art methods and nozzles is high noise levels. In large pan, the high noise levels are caused by the impact of portions of the fluid stream on the surface of the pool or body of water in which the nozzles are located. For certain prior art devices the noise level also increases due to the manner in which the fluid flow direction is abruptly changed; for instance, with the Aquatique device, the water direction is changed by directing high pressure water directly against a face plate causing substantial turbulence and loud noise. Noise levels experienced in these prior art devices are distractions which impair the ability of observers of the displayed images to clearly hear any accompanying audio track or effects and compromise show quality.

Yet another problem with prior art devices is seen in the overspray of fluid which contributes to the high noise levels described previously. This overspray also indicates that a significant percentage of the incoming fluid does not contribute to the formation of the projection screen and is therefore wasted.

Accordingly, there has existed a definite need for a fluid projection screen device and method which provides a projection screen which is uniform and provides for a clear and bright projection on it. There also exists a need for a fluid projection screen nozzle that operates at a low noise level so that it does not interfere with or detract from the display. There also exists the need for a nozzle that optimizes the utilization of the fluid flowing to produce the projection screen. The present invention satisfies these and other needs, and provides further related advantages.

SUMMARY OF THE INVENTION

The just-described problems of the prior art are addressed and solved by the present invention. In particular, the present invention provides a fluid nozzle for creating a fluid screen upon which a still or moving image may 15 be projected without the deficiencies of the prior art devices. The present invention creates a stable screen having high diffusion and uniform cross-section. When a still or moving image is projected on the fluid screen, preferably from behind it with respect to the observer, the image is pleasing to the eye because it is sharp, bright and uniform. The present invention provides simplicity of the design and operation for efficient operation on a continuous and consistent basis. It is designed so that it operates with substantially reduced noise levels which lends significantly to the enjoyment of the display, particularly when sound is added. These capabilities are believed to advance the an significantly.

The projection water screen nozzle of the present invention is mechanically simple with no moving parts. The result is reliability of operation and ease of maintenance (especially for cleaning). Moreover, because there is only one spray generation point, it is not necessary to balance the flow of fluid through multiple nozzles as required by the prior art.

In the present invention, the fluid projection screen nozzle components include an axial flow director and a nozzle insert with its associated components, and may preferably include a reducer and a flow straightener. Each of the components of the nozzle insert—internal end, transition section, and radial stabilizer—contribute to achieving the desired shape of the fluid projection screen. In operation, a fluid, typically water, is directed through the axial flow director, past the internal end of the nozzle insert and its transition section, and then onto and away from its radial stabilizer. The fluid is deflected radially outward from the radial stabilizer to form the fluid projection screen. The performance of the projection water screen can be further optimized by the insertion of a flow straightener, typically multiple tubes, within the axial flow director and upstream of the nozzle insert components.

When the fluid enters the fluid projection screen nozzle of the present invention, it first passes into the axial flow director which preferably has the shape of an axially oriented segment of straight pipe or tubing. The axial flow director directs the flow of fluid axially toward the nozzle insert. The internal end of the nozzle insert is rigidly positioned, and fits snugly, inside the exit end of the axial flow director. Passing through the axial flow director, the fluid contacts the internal end of the nozzle insert which, in conjunction with the axial flow director, reduces the cross-sectional area available for fluid flow from the full diameter of the axial flow director to a restricted area in the shape of a hollow cylinder sector.

Because the fluids used in the operation of the present invention are generally considered to be incompressible, this reduction in area from the open axial flow director to the hollow cylinder sector is associated with a corresponding increase in fluid velocity. The flow through the hollow cylinder sector damps the fluid turbulence of the incoming fluid. Providing a fluid with less turbulence enhances the aesthetics of the fluid projection screen of the present invention.

Although the reduction of fluid flow area from the full area of the axial flow director to the hollow cylinder sector may be caused instantaneously, the gradual reduction of fluid flow area by the addition of a reducer at the internal end of the nozzle insert reduces turbulence of the fluid exiting the axial flow director, and is therefore desirable.

Additional damping of the fluid may be desired depending on the quality of the projection fluid screen sought. The addition of a flow straightener provides this additional damping. The flow straightener may be added either prior to, or within the axial flow director.

The fluid exits the end of the axial flow director from the hollow cylinder sector created by the axial flow director and the internal end of the nozzle insert. The end of the nozzle insert, having the transition section and the radial stabilizer, protrudes from the end of the axial flow director. Flow fins, which act to constrain the fluid flow, are located on each side of the transition section and radial stabilizer. When the nozzle is horizontally oriented, the flow fins channel all of the fluid flow along the top of the nozzle insert after the fluid exits the axial flow director, preventing the flow of fluid downward. Elimination of the downward flow of fluid eliminates much of the noise associated with the prior art devices. Without the flow fins, the fluid is not prevented from flowing downward and impacting the surface of the facility in which the nozzle is located, causing noise. Thus, in the present invention, virtually none of the fluid strikes the pool or pond in which the nozzle is mounted when exiting the nozzle.

The flow fins also increase the efficiency of the nozzle by eliminating the fluid loss from projection in the non-screen direction; more of the fluid is used to create the screen.

The flow fins extend outward from the surface of the transition area and along the radial stabilizer. The flow fins form an open channel which continues to constrain the fluid to the angle subtended by the hollow cylinder sector. The hollow cylinder sector lip and the flow fins are contiguous and coplanar with respect to each other. Further the angle subtended by the hollow cylinder sector and the flow fins is selectable and directable to best serve the requirements for the projection fluid screen. When the projection fluid nozzle is horizontally oriented, the fluid exits the axial flow director, then passes along the transition section of the nozzle insert.

The transition section of the nozzle insert changes the fluid flow from the one-dimensional flow parallel to the axis of the axial flow director to radial, in which all flow lines are perpendicular to the axis of the axial flow director. The outwardly curving profile of the transition section optimizes the fluid distribution during the change in axial orientation from axial flow to radial flow, which ensures the proper distribution of fluid exiting the radial stabilizer. In this way, the thickness of the fluid screen created is more uniform than that of the prior art devices and methods (which violently smash the water against a face plate to change its direction). Because the fluid projection screen created with the present invention is more uniform than prior art screens, it enables a narrow focal point for the projected image and thus a clearer image is obtainable.

The fluid leaves the transition section having changed its direction of flow and passes across the radial stabilizer. The radial stabilizer has a preferred shape which is generally flat. It is important that the radial stabilizer withstand the residual fluid forces created by the changing of the direction of the fluid flow in the transition section. Although the face of the radial stabilizer is preferably flat, it may have different shapes according to the desired shape of the fluid screen.

Another important feature of the present invention is the inclusion of a uniform (but not smooth) surface texture, preferably scoring, may be included on the surface of the transition section, radial stabilizer, or preferably both to increase the uniformity of the dispersed fluid. The scoring may be applied in concentric circles radiating outward from the axis of the nozzle insert. The texture causes the fluid projection screen to be formed of finer droplets than in prior devices. This feature enables the present invention to create a fluid screen having a more uniform projection surface with increased diffusion which results in brighter images.

It is therefore an object of the present invention to provide a device and method for creating a fluid projection screen on which may be projected a still or moving picture.

It is a further object of the present invention to provide a device and method for creating a fluid projection screen which is mechanically simple to use, wherein the fluid screen created is accurately repeatable.

Still another object of the present invention is to provide device and method for creating a fluid projection screen which is reliable.

Yet another object of the present invention is to provide a device and method for creating a fluid projection screen which is uniform in thickness.

An additional object of the present invention is to provide a device and method for creating a fluid projection screen have high illuminance.

It is yet a further object of the present invention to provide a device and method for creating a fluid projection screen which operates at low noise levels.

A still further object of the present invention is to provide an apparatus and method for creating a fluid projection screen in which virtually all of the flowing fluid becomes part of the fluid screen.

Further objects and advantages of this invention will become more apparent from the following description of the preferred embodiment, taken in conjunction with the accompanying drawings, which illustrate, by way of example, the principles of the invention.

BRIEF DESCRIPTION OF THE DRAWINGS

The accompanying drawings illustrate the invention. In such drawings are illustrated the devices of the embodiments of the present invention in which:

FIG. 1 is an overall perspective view of an image display, showing display created by the method and apparatus of the present invention.

FIG. 2 is an exploded perspective view of a preferred embodiment of the present invention.

FIG. 3 is a cross-sectional side view of a fluid screen nozzle of the present invention.

FIG. 4 is a sectional view of the fluid screen nozzle taken substantially along the line 4—4 in FIG. 3.

FIG. 5 is a sectional view of the fluid screen nozzle taken substantially along the line 5—5 in FIG. 3.

FIG. 6 is a perspective view of the nozzle insert joined to a graduated reducer.

FIG. 7 is a perspective view showing the nozzle insert separated from the graduated reducer.

DESCRIPTION OF THE PREFERRED EMBODIMENTS

An apparatus and method for creating a fluid projection screen, according to the preferred embodiment of the present invention, is embodied in a nozzle generally referred to by the reference numeral 10.

FIGS. 2 and 3 show the fluid projection screen nozzle which typically uses water as the fluid medium. The nozzle consists of an axial flow director 20 and a nozzle insert 26 with its associated parts. Nozzle insert 26, which is preferably made of stainless steel, has three distinct parts—internal end 34, transition section 36 and radial stabilizer 38 (FIGS. 2, 3, 6 and 7). Fluid is introduced to axial flow director 20 by a supply line (not shown). Axial flow director 20 is preferably constructed from a length of 4-½" inch, ¼" wall tubing. The inlet end 21 of axial flow director 20 can be provided with a flange 22 for attachment to the supply pipe (not shown) or externally threaded for accepting standard pipe fittings of the supply line which connects to the supply system (not shown).

As shown in FIGS. 2, 3 and 4, internal end 34 of nozzle insert 26 fits snugly within axial flow director 20; the outside diameter of internal end 34 of nozzle insert 26 is closely matched to the inside diameter of axial flow director 20 along a substantial portion of its perimeter. Nozzle insert 26 is positioned within axial flow director 20 and is rigidly attached to it. Referring to FIG. 3, two matching threaded holes 37 are aligned axially in the bottom of the axial flow director 20 and continue into internal end 34 of nozzle insert 26 for receiving standard threaded fasteners 35 which pass through threaded holes 37 in the wall of axial flow director 20, securing it to nozzle insert 26.

The internal end 34 of nozzle insert 26, in conjunction with axial flow director 20, forms hollow cylinder sector 28 which is shown in FIG. 4. FIG. 7 shows internal end 34 of nozzle insert 26 having a flat surface 33 perpendicular to the direction of fluid flow, which contacts the incoming fluid, or to it may be further added reducer 32. FIGS. 2, 3, and 6 show nozzle insert 26 having reducer 32 attached to the internal end 34 of nozzle insert 26. Reducer 32 is graduated and provides for directing the flow of the liquid along its angled incline and into hollow cylinder sector 28. Typically, reducer 32 has a reducer surface 31 oriented along an axis inclined at an angle from the axis of axial flow director 20.

Reducer surface 31 is flat and substantially elliptical. Where it contacts nozzle insert 26, reducer 32 smoothly transitions into internal end 34 of nozzle insert 26, creating the smooth transition from the full flow area of axial flow director 20 to the restricted flow space of hollow cylinder sector 28.

Hollow cylinder sector 28 is formed in the space between internal end 34 of nozzle insert 26 and the inside surface of axial flow director 20 by cutting away evenly part of the surface of internal end 34. The cut extends the length of internal end 34. FIG. 7 shows angle 0, formed by the cut and a point along the centerline of axial flow director 20. This angle is selectable and directable to best meet the requirements of the projection screen. Once the profile of hollow cylinder sector 28 has been established across the surface of the internal end 34 of nozzle insert 26, it continues for its remaining length to the end of axial flow director 20.

As shown in FIG. 4, the available fluid flow area is thus reduced from the full flow area of the unrestricted axial flow director 20 to hollow cylinder sector 28. Hollow cylinder sector 28 typically permits a nominal flow rate of 800 gallons per minute at a 200 psig pressure. In this annular region, the turbulence of the fluid flow is damped producing preferred flow characteristics.

At the terminus of the internal end 34 of nozzle insert 26 from axial flow director 20 may be further located an annular groove (not shown) for holding a truncated elastomeric O-ring (not shown). The truncated elastomeric O-ring is used to create a tight seal between axial flow director 20 and the internal end 34 of nozzle insert 26. It begins on each side at the hollow cylinder sector and continues around the internal end 34 of nozzle insert 26, positioned at the point where nozzle insert 26 leaves axial flow director 20. The truncated O-ring may be eliminated by creating close tolerances between the axial flow director and its contact region with the internal end 34 of nozzle insert 26.

The transition section 36 between the exit point of nozzle insert 26 from axial flow director 20 to the surface of radial stabilizer 38 is blended outward evenly in a progressively increasing diameter from the diameter of the internal end 34 of nozzle insert 26 to approximately half of the diameter of radial stabilizer 38. The fluid then contacts transition section 36 where the flow direction of the fluid is substantially changed from axial to radial. The fluid then contacts radial stabilizer 38 and is further directed outward to create the fluid projection screen. Radial stabilizer 38 is preferably constructed of stainless steel and consists of a 10-inch diameter flat disk oriented perpendicular to the axis of the internal end 34 of nozzle insert 26.

An important feature of the present invention is the inclusion of concentric ridges 41 on the surfaces of the transition section 36 and radial stabilizer 38 to improve the production of uniform fluid droplets that form the projection screen. Surfaces having a machining roughness of 80 to 100 have been found to be suitable for use the present invention.

Another important feature of the present invention is the provision of flow fins 40 extending axially and outward along the transition section 36. The fins commence at the exit end of axial flow director 20 and are coplanar with lip 39, which is formed by the cutaway portion of hollow cylinder sector 28. Fluid is directed from hollow cylinder sector 28, with the outer bounds of the fluid path defined by lip 39, then onto transition section 36 and its flow fins 40. As the fluid passes along transition section 36 there is minimal, if any, fluid travel in the non-screen direction at the exit of the fluid from axial flow director 20.

To further damp the turbulence of the fluid incoming to nozzle 10, flow straightener 50 may be included upstream of nozzle insert 26. As shown in FIGS. 2 and 3, flow straightener 50 can be parallel tubes beginning at the entrance to the axial flow director 20. Flow straightener 50 may be an insert which is rigidly fixed in place, or it may be permanently welded within axial flow director 20. Other types of flow straighteners may be used instead of tubing, depending on any additional damping sought and/or space required in a specific application.

In FIG. 1 is shown the apparatus of the present invention as it appears in operation. With the water projection nozzle in a horizontal orientation just at water level, water is pumped through it. As previously described, the water projection screen nozzle creates the water projection screen. A projector is preferably positioned on the opposite side of the water projection screen from the observer. The projector projects the image toward the screen in the same direction as the direction of water flow. Looking at the water projection screen from the opposite side, the observer sees a bright, clear image (in this instance, a dragon) which can be caused to dissappear and reappear virtually instantaneously by merely stopping and starting the water flow (to the fluid projection nozzle) and the projection of the image.

The present invention has been described above in terms of a presently preferred embodiment so that an understanding of the invention can be conveyed. There are, however, many configurations for apparatuses and methods for producing fluid projection screens not specifically described herein, but with which the present invention is applicable. The present invention should therefore not be seen as limited to the particular embodiment described herein. Accordingly, modifications and variations to which the invention is susceptible may be practiced by those skilled in the art in view of the description herein, without departing from the scope and intent of the following claims.

We claim:

1. A fluid projection screen nozzle for creating a fluid projection screen, the fluid projection screen nozzle comprising:
    an axial flow director for directing a flowing fluid axially toward a fluid exit, said flowing fluid having a flow direction; and,
    a nozzle insert positioned at said fluid exit, said nozzle insert comprising:
        a flow restrictor rigidly affixed within said axial flow director at said fluid exit, said flow restrictor reducing the area of fluid flow within said axial flow director thereby increasing the velocity of the flowing fluid;
        a transition element for smoothly changing said flow direction from axial to substantially radial, said transition element having a first end downstream of and contiguous with said flow restrictor, an opposed larger second end, and a curving surface resembling a segment of a bell by flaring outwardly therebetween for smoothly transitioning direction of said flowing fluid from axial to substantially radial, said curving surface extending beyond said fluid exit of said axial flow director; and
        a radial stabilizer attached to said second end of said transition element to stabilize and complete the transition of the direction of said flowing fluid from axial to substantially radial, whereby said flowing fluid continues beyond said radial stabilizer to form said fluid projection screen.

2. The fluid projection screen nozzle according to claim 1, wherein the curving surface follows an arc of a circle.

3. The fluid projection screen nozzle according to claim 1, wherein the transition element is scored in concentric grooves of increasing radius.

4. The fluid projection screen nozzle according to claim 1, further comprising flow fins beginning on each side of the transition element, and continuing along the radial stabilizer, for channeling the fluid flow along the top of the nozzle insert.

5. The fluid projection screen nozzle according to claim 1 further comprising a plurality of axial tubes positioned inside the axial flow direction, the axes of said tubes aligned parallel to the axis of said axial flow director.

6. The fluid projection screen nozzle according to claim 5, wherein the curving surface follows an arc of a circle.

7. The fluid projection screen nozzle according to claim 5, wherein the transition element is scored in concentric grooves of increasing radius.

8. The fluid projection screen nozzle according to claim 5, further comprising flow fins beginning on each side of the transition element, and continuing along the radial stabilizer, for channeling the fluid flow along the top of the nozzle insert.

9. A method for using flowing fluid for creating a fluid projection screen, the method comprising the steps of:
    (a) directing the fluid flow axially;
    (b) providing a restriction int he fluid path to accelerate the fluid;
    (c) changing the direction of the fluid flow from axial to radial by directing the fluid onto a curved surface providing a transition from an axial direction to a radial direction; and
    (d) directing the fluid from the curved surface onto a radial stabilizer to further guide the fluid radially to form the fluid screen.

10. The method according to claim 9, further comprising the step of providing textured surfaces concentric to and in the path of the fluid flow direction.

11. The method according to claim 9, further comprising the step of straightening the fluid flow axially.

12. A fluid projection screen nozzle for creating a fluid projection screen, the fluid projection nozzle comprising;
    an axial flow director for directing the entering fluid;
    a nozzle insert in the axial flow director for smoothly changing the direction of fluid flow from axial to substantially radial and projecting said fluid substantially radially outward to create said fluid projection screen; and
    a plurality of axial tubes positioned inside the axial flow director, the axes of said tubes aligned parallel to the axis of said axial flow director.

13. A fluid projection screen system for creating an image on a fluid projection screen, the fluid screen projection system comprising:

a fluid screen nozzle for projecting flowing fluid to create a fluid screen, the fluid screen nozzle comprising:
an axial flow director for directing the entering fluid; and,
a nozzle insert in the axial flow director for smoothly changing the direction of fluid flow from axial to substantially radial and projecting said fluid substantially radially outward to create said fluid projection screen;
flowing fluid for directing through said fluid screen nozzle and creating said fluid screen; and
a projected image on said fluid projection screen.

14. The fluid projection screen system according to claim 13 further comprising a plurality of axial tubes positioned inside the axial flow director, the axes of said tubes aligned parallel to the axis of said axial flow director.

15. A fluid projection screen system for creating an image on a fluid projection screen, the fluid projection screen system comprising:
an axial flow director for directing a flowing fluid axially toward a fluid exit; and
a nozzle insert positioned at said fluid exit, said nozzle insert comprising:
a flow restrictor rigidly affixed within said axial flow director at said fluid exit, said flow restrictor reducing the area of fluid flow within said axial flow director thereby increasing the fluid velocity;
a transition element for smoothly changing the direction of fluid flow from axial to substantially radial, said transition element having a first end downstream of and contiguous with said flow restrictor, an opposed larger second end, and a curving surface resembling a segment of a bell by flaring outwardly therebetween for smoothly transitioning said fluid from axial to substantially radial flow, said curving surface extending beyond said fluid exit of said axial flow director, and
a radial stabilizer attached to said second end of said transition element for stabilizing and completing the transition of the direction of fluid flow from axial to substantially radial and forming said fluid projection screen,
flowing fluid for directing through said fluid screen nozzle and creating said fluid screen, and
a projected image on said fluid projection screen.

16. The fluid projection screen system according to claim 15, wherein the curving surface follows an arc of a circle.

17. The fluid projection screen system according to claim 15, wherein the transition element is scored in concentric grooves of increasing radius.

18. The fluid projection screen system according to claim 15, further comprising flow fins beginning on each side of the transition element, and continuing along the radial stabilizer, for channeling the fluid flow along the top of the nozzle insert.

19. The fluid projection screen system according to claim 15 further comprising a plurality of axial tubes positioned inside the axial flow director, the axes of said tubes aligned parallel to the axis of said axial flow director.

20. A fluid projection screen nozzle for creating a fluid projection screen, the fluid screen projection nozzle comprising:

an axial flow director that imparts a substantially axial direction on a fluid flow toward a fluid exit, said fluid flow having a cross-sectional area and a velocity; and,
a nozzle insert, said nozzle insert, positioned at said fluid exit, having:
a flow restrictor, rigidly affixed within said axial flow director at said fluid exit, having a smaller end positioned within said axial flow director, an opposed larger end positioned at said fluid exit, and a restrictor body therebetween having a restrictor surface, said flow restrictor reducing the cross-sectional area of said fluid flow within said axial flow director thereby increasing the velocity of said fluid flow, and
a transition element, attached to said flow restrictor at said larger end, having a first end of a first radius, an opposed second end of a larger radius, and a transition body therebetween having a length and a changing radius, said changing radius increasing smoothly at a greater than linear rate along said length, said transition body having a transition surface whose tangent at said second end is substantially perpendicular to said axial flow director, said transition surface at said first end being smoothly contiguous with said restrictor surface at said larger end, said transition element smoothly changing said substantially axial direction of said fluid flow at said first end to a substantially radial direction at said second end,
a radial stabilizer, attached to said transition element at said second end, having a stabilizer surface being smoothly contiguous with said transition surface at said second end, said stabilizer surface expanding to a terminal end, said radial stabilizer stabilizing said substantially radial direction of said fluid flow to form said fluid projection screen beyond said terminal end of said radial stabilizer in a substantially radial direction.

21. The fluid projection screen according to claim 20, wherein the cross-sectional area between the axial flow director and the flow restrictor is a hollow cylinder sector.

22. A fluid projection screen nozzle for creating a fluid projection screen, the fluid projection screen nozzle comprising:
an axial flow director having the shape of an axially oriented segment of straight pipe for directing a flowing fluid axially toward a fluid exit, said flowing fluid having a flow direction; and,
a nozzle insert positioned at said fluid exit, said nozzle insert comprising:
a flow restrictor rigidly affixed within said axial flow director at said fluid exit, said flow restrictor, in conjunction with said axial flow director, reducing the cross-sectional area available for fluid flow from the full diameter of the axial flow director to a hollow cylinder sector thereby increasing the velocity of the flowing fluid;
a transition element for smoothly changing said flow direction from axial to substantially radial, said transition element having a first end downstream of and contiguous with said flow restrictor, an opposed larger second end, and a curving surface resembling a segment of a bell by flaring outwardly therebetween for smoothly transitioning direction of said flowing fluid from axial to substantially radial, said curving surface extending beyond said fluid exit of said axial flow director; and a radial stabilizer attached to said second end of said transition element to stabilize and complete the transition of the direction of said flowing fluid from axial to substantially radial whereby said flowing fluid continues beyond said radial stabilizer to form said fluid projection screen.

23. The fluid projection screen nozzle according to claim 22, wherein the curving surface follows an arc of a circle.

24. A method for creating a fluid projection screen system, the method comprising the steps of:

directing flowing fluid axially;

smoothly changing the direction of fluid flow from axial to substantially radial by directing the fluid onto a curved surface providing a smooth transition from an axial direction to a radial direction, and directing said fluid substantially radially outward to create a fluid projection screen; and projecting an image on said fluid projection screen.

25. A method for creating a fluid projection screen, the method comprising the steps of:

directing flowing fluid axially;

directing the fluid through a hollow cylinder sector;

guiding the fluid from the hollow cylinder sector onto a curved surface; and smoothly changing the direction of fluid flow from axial to substantially radially and directing said fluid substantially radially outward to create said fluid projection screen.

* * * * *